United States Patent
Ma et al.

(10) Patent No.: US 11,036,693 B2
(45) Date of Patent: Jun. 15, 2021

(54) APPARATUS OF CONTINUOUS PROFILING FOR MULTICORE EMBEDDED SYSTEM AND METHOD OF THE SAME

(71) Applicant: ELECTRONICS AND TELECOMMUNICATIONS RESEARCH INSTITUTE, Daejeon (KR)

(72) Inventors: Yu-Seung Ma, Daejeon (KR); Sang-Cheol Kim, Daejeon (KR); Pyeong-Soo Mah, Daejeon (KR); Duk-Kyun Woo, Daejeon (KR); Jeong-Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 246 days.

(21) Appl. No.: 16/045,614

(22) Filed: Jul. 25, 2018

(65) Prior Publication Data
US 2019/0042596 A1   Feb. 7, 2019

(30) Foreign Application Priority Data
Aug. 7, 2017   (KR) .................. 10-2017-0099705

(51) Int. Cl.
*G06F 17/00* (2019.01)
*G06F 7/00* (2006.01)
(Continued)

(52) U.S. Cl.
CPC ...... *G06F 16/1865* (2019.01); *G06F 11/3013* (2013.01); *G06F 11/323* (2013.01);
(Continued)

(58) Field of Classification Search
CPC .............. G06F 16/1865; G06F 16/904; G06F 11/3013; G06F 11/323; G06F 11/3466; G06F 2201/86
(Continued)

(56) References Cited

U.S. PATENT DOCUMENTS

| | | | |
|---|---|---|---|
| 6,779,107 B1 * | 8/2004 | Yates ................ | G06F 9/45554 712/229 |
| 6,954,923 B1 * | 10/2005 | Yates, Jr. ........... | G06F 9/30174 717/130 |

(Continued)

FOREIGN PATENT DOCUMENTS

| KR | 10-2010-0112137 A | 10/2010 |
|---|---|---|
| KR | 10-2015-0075830 A | 7/2015 |

(Continued)

*Primary Examiner* — Pavan Mamillapalli

(57) ABSTRACT

Disclosed herein is an apparatus for continuous profiling for a multicore embedded system, the apparatus including a profiling data reception unit for receiving one or more pieces of profiling source data, in which events for each core in a multicore embedded system are written, from the multicore embedded system; a profiling data analysis unit for analyzing the profiling source data, determining a time at which each of events included in the profiling source data occurred and a core corresponding to the event, and determining whether each of the events is a past event depending on the time at which the event occurred; and a profiling file management unit for distinguishing each of the events depending on the determination of whether the event is a past event and storing the events in profiling files.

16 Claims, 13 Drawing Sheets

(51) Int. Cl.
*G06F 16/18* (2019.01)
*G06F 16/904* (2019.01)
*G06F 11/32* (2006.01)
*G06F 11/34* (2006.01)
*G06F 11/30* (2006.01)

(52) U.S. Cl.
CPC ........ *G06F 11/3466* (2013.01); *G06F 16/904* (2019.01); *G06F 2201/86* (2013.01)

(58) Field of Classification Search
USPC ........................................................ 707/752
See application file for complete search history.

(56) References Cited

U.S. PATENT DOCUMENTS

| | | | | |
|---|---|---|---|---|
| 6,978,462 | B1* | 12/2005 | Adler | G06F 9/30149 719/318 |
| 7,305,663 | B1* | 12/2007 | McGuire | G06F 11/3495 717/124 |
| 7,962,314 | B2 | 6/2011 | Chernoff | |
| 8,607,202 | B2 | 12/2013 | Nadbath et al. | |
| 9,400,736 | B2* | 7/2016 | Gainey, Jr. | G06F 11/3644 |
| 9,648,075 | B1* | 5/2017 | Kalinke | G06F 3/04842 |
| 9,678,851 | B2 | 6/2017 | Cardona et al. | |
| 2004/0078797 | A1* | 4/2004 | Liao | G06F 16/40 719/310 |
| 2005/0086650 | A1* | 4/2005 | Yates, Jr. | G06F 9/45533 717/139 |
| 2012/0151103 | A1* | 6/2012 | Hu | G06F 12/08 710/22 |
| 2014/0372810 | A1 | 12/2014 | Na | |
| 2015/0106789 | A1* | 4/2015 | Cardona | G06F 11/3466 717/127 |
| 2016/0156643 | A1 | 6/2016 | Choi | |

FOREIGN PATENT DOCUMENTS

| | | |
|---|---|---|
| KR | 10-2016-0066291 A | 6/2016 |
| KR | 10-1694310 B1 | 1/2017 |

\* cited by examiner

| | 21 |
|---|---|
| D0_0 | E0_00(1:00), E0_01(1:02), E0_02(1:04), E0_03(1:06), E0_04(1:08), E0_05(1:10), E0_06(1:12), E0_07(1:14), E0_08(1:16), E0_09(1:18) |
| D0_1 | E0_10(1:20), E0_11(1:22), E0_12(1:24), E0_13(1:26), E0_14(1:28), E0_15(1:30), E0_16(1:32), E0_17(1:34), E0_18(1:36), E0_19(1:38) |
| D2_0 | E2_00(1:00), E2_01(1:05), E2_02(1:10), E2_03(1:15), E2_04(1:20), E2_05(1:25), E2_06(1:30), E2_07(1:35), E2_08(1:40), E2_09(1:45) |
| D0_2 | E0_20(1:40), E0_21(1:42), E0_22(1:44), E0_23(1:46), E0_24(1:48), E0_25(1:50), E0_26(1:52), E0_27(1:54), E0_28(1:56), E0_29(1:58) |
| D3_0 | E3_00(1:15), E3_01(1:30), E3_02(1:35), E3_03(1:40), E3_04(1:45), E3_05(1:50), E3_06(1:55), E3_07(1:57), E3_08(2:01), E3_09(2:11) |
| D0_3 | E0_30(2:00), E0_31(2:03), E0_32(2:06), E0_33(2:09), E0_34(2:12), E0_35(2:15), E0_36(2:18), E0_37(2:21), E0_38(2:24), E0_39(2:27) |
| D0_4 | E0_40(2:30), E0_41(2:33), E0_42(2:36), E0_43(2:39), E0_44(2:42), E0_45(2:45), E0_46(2:48), E0_47(2:51), E0_48(2:54), E0_49(2:57) |
| D2_1 | E2_10(1:50), E2_11(1:55), E2_12(2:00), E2_13(2:08), E2_14(2:16), E2_15(2:24), E2_16(2:32), E2_17(2:40), E2_18(2:50), E2_19(2:57) |
| D1_0 | E1_00(1:03), E1_01(1:23), E1_02(1:43), E1_03(2:03), E1_04(2:23), E1_05(2:33), E1_06(2:43), E1_07(2:53), E1_08(3:00), E1_09(3:03) |
| D3_1 | E3_10(2:30), E3_11(2:37), E3_12(2:40), E3_13(2:47), E3_14(2:50), E3_15(2:52), E3_16(2:57), E3_17(3:02), E3_18(3:07), E3_19(3:17) |
| D0_5 | E0_50(3:00), E0_51(3:05), E0_52(3:10), E0_53(3:15), E0_54(3:20), E0_55(3:25), E0_56(3:30), E0_57(3:35), E0_58(3:40), E0_59(3:45) |
| D1_1 | E1_10(3:30), E2_11(3:35) |
| D2_2 | E2_20(3:15), E2_21(3:30), E2_22(3:44) |

FIG. 2

| FILE 1 (TIME INTERVAL → 1:00~1:58) | | | | | | | | | | |
|---|---|---|---|---|---|---|---|---|---|---|
| CORE0 | D0_0 | E0_00(1:00), | E0_01(1:02), | E0_02(1:04), | E0_03(1:06), | E0_04(1:08), | E0_05(1:10), | E0_06(1:12), | E0_07(1:14), | E0_08(1:16), | E0_09(1:18) |
| | D0_1 | E0_10(1:20), | E0_11(1:22), | E0_12(1:24), | E0_13(1:26), | E0_14(1:28), | E0_15(1:30), | E0_16(1:32), | E0_17(1:34), | E0_18(1:36), | E0_19(1:38) |
| | D0_2 | E0_20(1:40), | E0_21(1:42), | E0_22(1:44), | E0_23(1:46), | E0_24(1:48), | E0_25(1:50), | E0_26(1:52), | E0_27(1:54), | E0_28(1:56), | E0_29(1:58) |
| CORE1→EMPTY | | | | | | | | | | | |
| CORE2 | D2_0 | E2_00(1:00), | E2_01(1:05), | E2_02(1:10), | E2_03(1:15), | E2_04(1:20), | E2_05(1:25), | E2_06(1:30), | E2_07(1:35), | E2_08(1:40), | E2_09(1:45) |
| CORE3→EMPTY | | | | | | | | | | | |

| FILE 2 (TIME INTERVAL → 1:15~2:57) | | |
|---|---|---|
| D0_3 | E0_30(2:00), E0_31(2:03), E0_32(2:06), E0_33(2:09), E0_34(2:12), E0_35(2:15), E0_36(2:18), E0_37(2:21), E0_38(2:24), E0_39(2:27) | |
| D0_4 | E0_40(2:30), E0_41(2:33), E0_42(2:36), E0_43(2:39), E0_44(2:42), E0_45(2:45), E0_46(2:48), E0_47(2:51), E0_48(2:54), E0_49(2:57) | |

CORE1 → EMPTY

| CORE2 | D2_1 | E2_10(1:50), E2_11(1:55), E2_12(2:00), E2_13(2:08), E2_14(2:16), E2_15(2:24), E2_16(2:32), E2_17(2:40), E2_18(2:50), E2_19(2:57) |
| CORE3 | D3_0 | E3_00(1:15), E3_01(1:30), E3_02(1:35), E3_03(1:40), E3_04(1:45), E3_05(1:50), E3_06(1:55), E3_07(1:57), E3_08(2:01), E3_09(2:11) |

4a

| | | FILE 3 (TIME INTERVAL → 1:03~3:45) |
|---|---|---|
| CORE0 | D0_5 | E0_50(3:00), E0_51(3:05), E0_52(3:10), E0_53(3:15), E0_54(3:20), E0_55(3:25), E0_56(3:30), E0_57(3:35), E0_58(3:40), E0_59(3:45) |
| CORE1 | D1_0 | E1_00(1:03), E1_01(1:23), E1_02(1:43), E1_03(2:03), E1_04(2:23), E1_05(2:33), E1_06(2:43), E1_07(2:53), E1_08(3:00), E1_09(3:03) |
| | D1_1 | E1_10(3:30), E2_11(3:35) |
| CORE2 | D2_2 | E2_20(3:15), E2_21(3:30), E2_22(3:44) |
| CORE3 | D3_1 | E3_10(2:30), E3_11(2:37), E3_12(2:40), E3_13(2:47), E3_14(2:50), E3_15(2:52), E3_16(2:57), E3_17(3:02), E3_18(3:07), E3_19(3:17) |

| | | FILE 1 (TIME INTERVAL → 1:00~1:45) |
|---|---|---|
| CORE0 | D0_0 | E0_00(1:00), E0_01(1:02), E0_02(1:04), E0_03(1:06), E0_04(1:08), E0_05(1:10), E0_06(1:12), E0_07(1:14), E0_08(1:16), E0_09(1:18) |
| | D0_1 | E0_10(1:20), E0_11(1:22), E0_12(1:24), E0_13(1:26), E0_14(1:28), E0_15(1:30), E0_16(1:32), E0_17(1:34), E0_18(1:36), E0_19(1:38) |
| | D0_2 | E0_20(1:40), E0_21(1:42), E0_22(1:44) |
| CORE1 | D1_0 | E1_00(1:03), E1_01(1:23), E1_02(1:43) |
| CORE2 | D2_0 | E2_00(1:00), E2_01(1:05), E2_02(1:10), E2_03(1:15), E2_04(1:20), E2_05(1:25), E2_06(1:30), E2_07(1:35), E2_08(1:40), E2_09(1:45) |
| CORE3 | D3_0 | E3_00(1:15), E3_01(1:30), E3_02(1:35), E3_03(1:40), E3_04(1:45) |

| | | FILE 2 (TIME INTERVAL → 1:46~2:51) |
|---|---|---|
| CORE0 | D0_2 | E0_23(1:46), E0_24(1:48), E0_25(1:50), E0_26(1:52), E0_27(1:54), E0_28(1:56), E0_29(1:58) |
| | D0_3 | E0_30(2:00), E0_31(2:03), E0_32(2:06), E0_33(2:09), E0_34(2:12), E0_35(2:15), E0_36(2:18), E0_37(2:21), E0_38(2:24), E0_39(2:27) |
| | D0_4 | E0_40(2:30), E0_41(2:33), E0_42(2:36), E0_43(2:39), E0_44(2:42), E0_45(2:45), E0_46(2:48), E0_47(2:51) |
| CORE1 | D1_0 | E1_03(2:03), E1_04(2:23), E1_05(2:33), E1_06(2:43) |
| CORE2 | D2_1 | E2_10(1:50), E2_11(1:55), E2_12(2:00), E2_13(2:08), E2_14(2:16), E2_15(2:24), E2_16(2:32), E2_17(2:40), E2_18(2:50) |
| CORE3 | D3_0 | E3_05(1:50), E3_06(1:55), E3_07(1:57), E3_08(2:01), E3_09(2:11) |
| | D3_1 | E3_10(2:30), E3_11(2:37), E3_12(2:40), E3_13(2:47), E3_14(2:50) |

| FILE 3 (TIME INTERVAL→2:52~3:44) | | |
|---|---|---|
| CORE0 | D0_4 | E0_48(2:54), E0_49(2:57) |
| | D0_5 | E0_50(3:00), E0_51(3:05), E0_52(3:10), E0_53(3:15), E0_54(3:20), E0_55(3:25), E0_56(3:30), E0_57(3:35), E0_58(3:40), E0_59(3:45) |
| CORE1 | D1_0 | E1_07(2:53), E1_08(3:00), E1_09(3:03) |
| | D1_1 | E1_10(3:30), E2_11(3:35) |
| CORE2 | D2_1 | E2_19(2:57) |
| | D2_2 | E2_20(3:15), E2_21(3:30), E2_22(3:44) |
| CORE3 | D3_1 | E3_15(2:52), E3_16(2:57), E3_17(3:02), E3_18(3:07), E3_19(3:17) |

APPARATUS OF CONTINUOUS PROFILING FOR MULTICORE EMBEDDED SYSTEM AND METHOD OF THE SAME

CROSS REFERENCE TO RELATED APPLICATION

This application claims the benefit of Korean Patent Application No. 10-2017-0099705, filed Aug. 7, 2017, which is hereby incorporated by reference in its entirety into this application.

BACKGROUND OF THE INVENTION

1. Technical Field

The present invention relates to technology for continuous profiling through which the long-term behavior of a multicore embedded system may be analyzed.

2. Description of the Related Art

A multicore program is an application installed in multicore hardware and run thereon, and the tasks thereof are processed in parallel using multiple cores, whereby performance may be improved. A multicore system performs tasks running on multiple cores in parallel, thereby providing fast performance to users.

Because a multicore system is configured such that tasks are run on multiple cores in parallel, the size of profiling data to be used to analyze the behavior of the multicore system may increase in proportion to the number of cores, compared to a single-core system. Further, because a result of scheduling in a multicore environment, in which a task can be migrated from one core to another core, is complicated and difficult to analyze, it is required to use a tool for helping analysis and visualizing the analysis result so as to be easily understood. Also, it is difficult to detect errors in a multicore system, and such errors may occur a long time after the program starts running. Accordingly, a tool having a function that enables analysis of the behavior of a program for a long time is required.

However, in the case of profiling for an existing multicore embedded system, the size of profiling data is limited to tens of megabytes due to the limited resources of an embedded target and a limitation as to the number of events that can be simultaneously visualized in a host. Therefore, it is difficult to perform long-term profiling.

The above-described information about the related art has been retained by the inventors for the purpose of developing the present invention or was obtained during the process of developing the present invention. Also, it should be appreciated that this information did not necessarily belong to the public domain before the patent filing date of the present invention. In connection with this, Korean Patent Application Publication No. 10-2016-0066291 discloses a technology related to "Apparatus and method for generating process activity profile".

SUMMARY OF THE INVENTION

An object of the present invention is to provide an apparatus and method for continuous profiling through which profiling for a multicore embedded system may be performed for a long time.

An embodiment of the present invention provides an apparatus for continuous profiling for a multicore embedded system, the apparatus including a profiling data reception unit for receiving one or more pieces of profiling source data, in which events of each core in a multicore embedded system are written, from the multicore embedded system; a profiling data analysis unit for determining a time at which each of the events included in the profiling source data occurred and a core corresponding to the event by analyzing the profiling source data and for determining whether each of the events is a past event depending on the time at which the event occurred; and a profiling file management unit for distinguishing each of the events depending on the determination of whether the event is a past event and storing the events in profiling files.

Here, the profiling file management unit may create a master file for storing information about time intervals corresponding to the respective profiling files.

Here, the profiling data analysis unit may determine that a target event is a past event when a time at which the target event occurred is included in a time interval corresponding to any of already created profiling files.

Here, when the target event is determined to be a past event, the profiling file management unit may identify a target profiling file, corresponding to the time at which the target event occurred, and merge and store the target event in the target profiling file such that events therein are listed on a core basis in a time-ordered sequence based on a time at which each of the events therein occurred.

Here, the profiling data analysis unit may merge the target event to analysis data on a core basis in a time-ordered sequence based on the time at which the target event occurred when it is determined that the target event is not a past event, and the profiling file management unit may store the analysis data as a new profiling file when a size of the analysis data reaches a preset first size after it is determined that the target event is not a past event.

Here, each of the profiling files may be configured such that events sorted on a core basis are merged therein.

Here, the profiling source data may have a preset second size.

Here, the profiling data reception unit may temporarily store the received pieces of profiling source data in memory in an order of arrival and deliver the pieces of profiling source data in the order of arrival.

Here, the apparatus may further include a profiling result visualization unit for visualizing profiling results corresponding to the profiling files.

Here, the profiling result visualization unit may visualize the profiling result on a profiling file basis.

Another embodiment of the present invention provides a method for continuous profiling for a multicore embedded system, the method including receiving one or more pieces of profiling source data, in which events of each core in a multicore embedded system are written, from the multicore embedded system; analyzing the profiling source data and thereby determining a time at which each of the events included in the profiling source data occurred and a core corresponding to the event; determining whether each of the events is a past event depending on the time at which the event occurred; and distinguishing each of the events depending on the determination of whether the event is a past event and storing the events in profiling files.

Here, storing the events in the profiling files may include creating a master file for storing information about time intervals corresponding to the respective profiling files.

Here, determining whether each of the events is a past event may be configured such that a target event is determined to be a past event when a time at which the target event occurred is included in a time interval corresponding to any of already created profiling files.

Here, storing the events in the profiling files may be configured to identify a target profiling file, corresponding to the time at which the target event occurred, when the target event is determined to be a past event, and to merge and store the target event in the target profiling file such that events therein are listed on a core basis in a time-ordered sequence based on a time at which each of the events therein occurred.

Here, determining whether each of the events is a past event may be configured to merge the target event to analysis data on a core basis in a time-ordered sequence based on the time at which the target event occurred when it is determined that the target event is not a past event; and storing the events in the profiling files may be configured to store the analysis data as a new profiling file when a size of the analysis data reaches a preset first size after it is determined that the target event is not a past event.

Here, each of the profiling files may be configured such that events sorted on a core basis are merged therein.

Here, the profiling source data may have a preset second size.

Here, receiving the profiling source data may be configured to temporarily store the received pieces of profiling source data in memory in an order of arrival and to deliver the pieces of profiling source data in the order of arrival.

Here, the method may further include visualizing profiling results corresponding to the profiling files.

Here, visualizing the profiling results may be configured to visualize the profiling result on a profiling file basis.

BRIEF DESCRIPTION OF THE DRAWINGS

The above and other objects, features and advantages of the present invention will be more clearly understood from the following detailed description taken in conjunction with the accompanying drawings, in which:

FIG. 2 is a view that shows an example of profiling source data in an embodiment of the present invention;

FIGS. 3 to 5 are views that show an example of a result of partitioning of the profiling source data illustrated in FIG. 2 into profiling files according to an embodiment of the present invention;

FIGS. 10 to 12 are views that show an example of a result of partitioning of the profiling source data illustrated in FIG. 2 into profiling files in an embodiment of the present invention.

DESCRIPTION OF THE PREFERRED EMBODIMENTS

Figure 1:
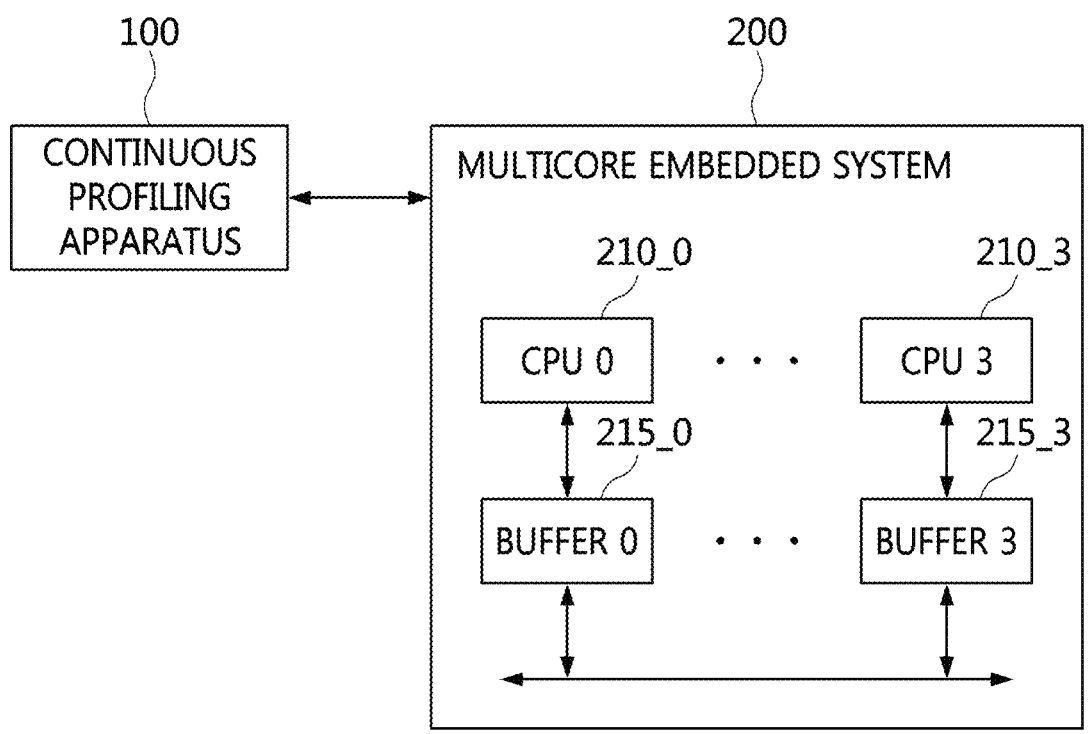
FIG. 1 is a view that shows the configuration of a system for continuous profiling for a multicore embedded system according to an embodiment of the present invention.

Because the present invention may be variously changed and may have various embodiments, specific embodiments will be described in detail below with reference to the attached drawings. The effects and features of the present invention and methods of achieving them will be apparent from the following exemplary embodiments, which will be described in more detail with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

However, the present invention is not limited to the embodiments to be described below, and all or some of the embodiments may be selectively combined and configured, so that the embodiments may be modified in various ways. It will be understood that, although the terms "first", "second", etc. may be used herein to describe various elements, these elements are not intended to be limited by these terms. These terms are used only to distinguish one element from another element. Also, a singular expression includes a plural expression unless a description to the contrary is specifically pointed out in context. Also, it should be understood that terms such as "include" or "have" are merely intended to indicate that features, components, parts, or combinations thereof are present, and are not intended to exclude the possibility that one or more other features, components, parts, or combinations thereof will be present or added.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a view that shows the configuration of a system 1 for continuous profiling for a multicore embedded system according to an embodiment of the present invention.

Referring to FIG. 1, the system 1 for continuous profiling for a multicore embedded system according to an embodiment of the present invention is configured such that a continuous profiling apparatus 100 for a multicore embedded system is interconnected with a multicore embedded system 200.

The continuous profiling apparatus 100 for a multicore embedded system according to an embodiment of the present invention receives profiling source data from the multicore embedded system 200, determines cores corresponding to events included in the received profiling source data and times at which the respective events occurred by analyzing the profiling source data, determines whether a target event is a past event using the time at which the target event occurred, and stores the target event in a profiling file by distinguishing the target event based on the determination of whether the target event is a past event.

Here, the profiling source data may have a preset size.

For example, the size of a single piece of profiling source data may be set such that data pertaining to ten events are included therein.

Here, the continuous profiling apparatus 100 for a multicore embedded system may temporarily store the received pieces of profiling source data in memory in the order of arrival, and may deliver the temporarily stored pieces of profiling source data in the order of arrival.

In an alternative embodiment, the continuous profiling apparatus 100 for a multicore embedded system may determine that a target event is a past event when the time at which the target event occurred is included in a time interval corresponding to any of already created profiling files. Therefore, when the time at which the target event occurred is not included in a time interval corresponding to any of the already created profiling files, it is determined that the target event is not a past event.

In an alternative embodiment, the continuous profiling apparatus 100 for a multicore embedded system may create analysis data by sorting events determined not to be past events on a core basis and by merging the events sorted for each core in a time-ordered sequence based on the time at which each of the events occurred.

In an alternative embodiment, when the size of the created analysis data reaches a preset size limit, the continuous profiling apparatus 100 for a multicore embedded system may store the analysis data as a new profiling file.

In an alternative embodiment, the continuous profiling apparatus 100 for a multicore embedded system may add an event determined to be a past event in the profiling file, corresponding to the time at which the event occurred, in a time-ordered sequence.

In an alternative embodiment, the continuous profiling apparatus 100 for a multicore embedded system may create a master file that stores information about time intervals corresponding to respective profiling files.

In an alternative embodiment, the continuous profiling apparatus 100 for a multicore embedded system may visualize profiling results corresponding to the created profiling files.

Here, the continuous profiling apparatus 100 for a multicore embedded system may visualize the profiling result on a profiling file basis.

The multicore embedded system 200 is a system that is implemented to use multiple cores 210_0 to 210_3.

Here, the multicore embedded system 200 may extract profiling data individually for each of the cores 210_0 to 210_3.

Here, the multicore embedded system 200 may record profiling data for the respective cores 210_0 to 210_3 in corresponding ones of buffers 215_0 to 215_3.

Here, profiling data, including information about events (for example, context switching, priority change, semaphore acquisition, and the like) triggered by tasks running on the respective cores 210_0 to 210_3 and information about the time at which each of the events occurred may be recorded.

Here, when any of the buffers (215_0 to 215_3) is filled up with profiling data, the data may be removed from the buffer and delivered to the host system according to a First-In First-Out (FIFO) method. Then, the empty buffer may be filled with the following profiling data.

That is, because a core that is working more than the other cores has more profiling data, the buffer thereof is filled up faster, and buffer data may be transferred more frequently.

Here, event data included in profiling source data may be recorded in a time-ordered sequence. As a result, the events included in pieces of profiling data created by a single core are sorted by time. However, it is not guaranteed that pieces of data in the buffers of different cores are sorted by time.

This is because the buffers of the different cores are filled at different speeds, and because the respective cores run their tasks in parallel.

FIG. 2 is a view that shows an example of profiling source data in an embodiment of the present invention.

In FIG. 2, 13 pieces of profiling source data D0_0 to D0_5, D1_0 to D1_1, D2_0 to D2_2, and D3_0 to D3_1 are illustrated.

Here, the profiling source data may be profiling data that is delivered after the profiling buffers (215_0 to 215_3 in FIG. 1) of cores (210_0 to 210_3 in FIG. 1) are filled up.

Here, (m+1)-th profiling source data created by core n is represented as Dn_m in FIG. 2. For example, profiling source data created by core 0 is represented as D0_x (D0_0, D0_1 to D0_5), and profiling source data created by core 1 is represented as D1_x.

Also, events in each piece of profiling source data are represented as En_xx, which means the (xx+1)-th event created by core n. In parentheses, the time at which the corresponding event occurred is written. For example, E0_04(1:08) means that the fifth event on core 0 occurred at 1 minute 08 seconds.

Examining only profiling source data for core 0 in FIG. 2, a total of six pieces of profiling source data D0_0 and D0_1 to D0_5 are present, and events included therein may be sorted by time. However, examining all pieces of profiling source data, events in D0_1, which is the second profiling source data of core 0, and events in D2_0, which is the first profiling source data of core 2, are in the wrong order. Specifically, E0_19, which is the last event in D0_1, occurred at 1:38, but E2_00, which follows E0_19, occurred at 1:00. This is because more events have occurred on core 0 and data accumulates faster than on core 2, and because the respective cores run their tasks in parallel.

As described above, the first events in the respective pieces of profiling source data may not be sorted by time when the multiple cores are working. However, the last events 21 therein are sorted by time even though the multiple cores are working. This is because profiling source data in a profiling buffer is delivered when the last event fills the profiling buffer.

FIGS. 3 to 5 are views that show an example of a result of partitioning of the profiling source data illustrated in FIG. 2 into profiling files according to an embodiment of the present invention.

The continuous profiling apparatus (100 in FIG. 1) for a multicore embedded system according to an embodiment of the present invention may receive profiling source data from the multicore embedded system (200 in FIG. 1) and merge and analyze the data. However, when continuous profiling is performed for a long time, the size of the merged profiling data becomes very large. In the case of a multicore embedded system in which synchronization is frequently performed, storage of hundreds of megabytes may be required within hours. In this case, it is more efficient to partition the data into multiple files than to manage the data as a single file.

Accordingly, the continuous profiling apparatus (100 in FIG. 1) for a multicore embedded system according to an embodiment of the present invention may partition the merged profiling data when the size thereof is greater than a certain size.

FIG. 3 shows a profiling file that stores profiling data that is partitioned when the number of events in the merged profiling data reaches 40. Here, profiling files 3a and 4a, excluding the last file 5a, have a constant size.

Here, the time intervals of the profiling files 3a, 4a and 5a may overlap. Therefore, it may be impossible to find a file in which a certain event is stored using only time information of the event.

For example, file 1 3a has data about events that occurred during a time interval from 1:00 to 1:58. However, not all of the events that occurred during the corresponding time interval are included in file 1 3a. That is, there may be an event that occurred during the corresponding time interval but is included in another file because the event is delivered to the host late. Also, file 2 4a has data about events that occurred during a time interval from 1:15 to 2:57. Therefore, the time interval of file 2 4a and the time interval of file 1 3a overlap (from 1:15 to 1:58). Here, a certain event that occurred during the overlapping time interval, for example, E2_09, may be stored in file 1 3a, but another event that occurred during the overlapping time interval, for example, E2_10, may be stored in file 2 4a. Therefore, when a specific single file is examined, complete information about the occurrence of events may not be checked.

Also, a profiling file may have no profiling data for a certain core.

Here, in order to solve the overlapping time interval problem, which is caused by partitioning data based on the size thereof, data may be partitioned based on a certain time interval, or data may be sorted by time after all of the data is received.

If data is partitioned depending on a certain time interval and stored as a file, the sizes of respective files are different, and a useless file may be created when there is no event in a corresponding time interval. For example, when a rule is made such that data is partitioned on a five-minute basis, no data may be created for several hours, or few events may occur during several hours. In this case, many useless files, each of which has only a header and little event information, may be created, or a small number of events may be divided and stored in many files. Furthermore, it is difficult to manage files due to the large difference between the sizes thereof.

Also, in order to partition data based on a certain time interval such that event information for all cores is included in the partitioned data, the time interval must be set long. For example, when the profiling source data of core 1 is delivered later than the profiling source data of other cores, partitioning may be delayed until the profiling source data D1_0 of core 1 is received.

Particularly, this problem may become serious when there is a core in which an event very rarely occurs. When an event for a certain core rarely occurs and a buffer is not filled, profiling source data is not delivered for a long time, which causes a problem in the process of partitioning data. That is, although continuous profiling is performed for a long time, the process of partitioning data into files is not performed the entire time. Then, the process of partitioning a large size of profiling source data is performed all at once at the end, whereby the process may be delayed for a long time.

Alternatively, data may be partitioned after all of the data is received and sorted by time. However, this method may not be adequate to be applied to continuous profiling, and the partitioning process may be time-consuming when the size of data is large.

In order to solve the above-mentioned problems, the continuous profiling apparatus 100 for a multicore embedded system may partition data in consideration both of the size of data and of time information, so that the process of partitioning data may be prevented from being delayed.

Figure 6:
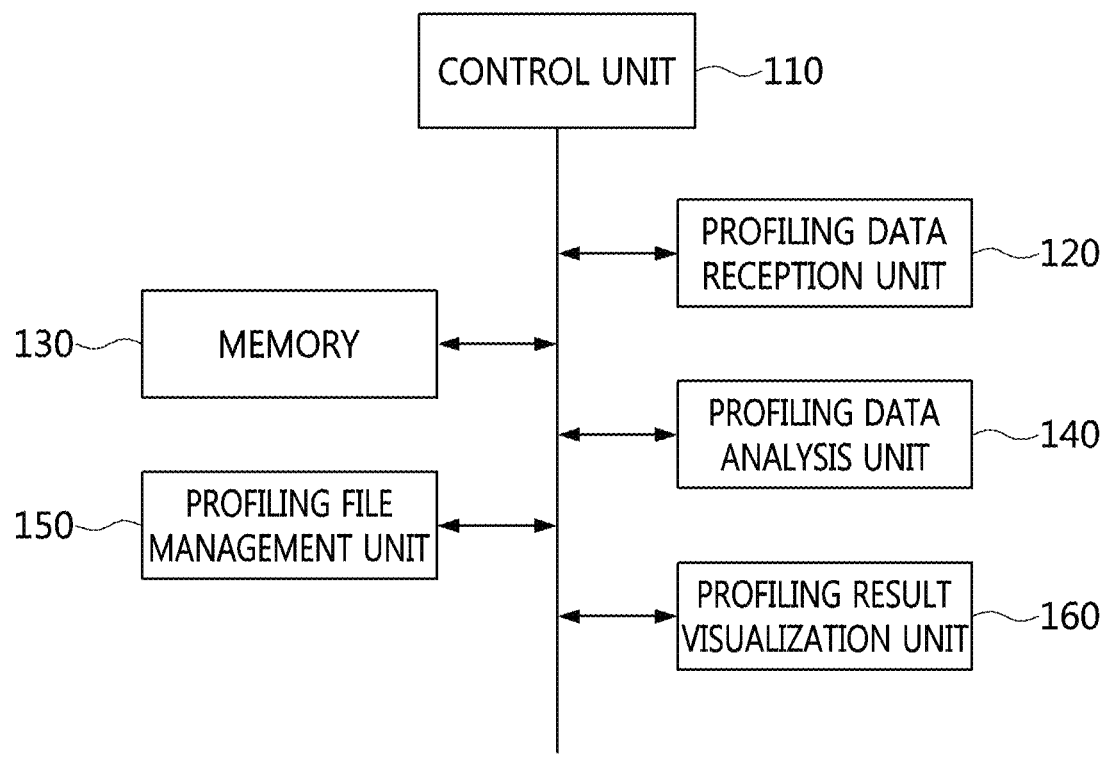
FIG. 6 is a block diagram that shows an example of an apparatus for continuous profiling for the multicore embedded system illustrated in FIG. 1.

FIG. 6 is a block diagram that shows an example of the continuous profiling apparatus for a multicore embedded system illustrated in FIG. 1.

Referring to FIG. 6, the continuous profiling apparatus 100 for a multicore embedded system according to an embodiment of the present invention includes a control unit 110, a profiling data reception unit 120, memory 130, a profiling data analysis unit 140, a profiling file management unit 150, a profiling result visualization unit 160, and the like.

Specifically, the control unit 110 is a kind of central processing unit, and controls the overall process of continuous profiling for a multicore embedded system. That is, the control unit 110 may provide various functions by controlling the profiling data reception unit 120, the profiling data analysis unit 140, the profiling file management unit 150, the profiling result visualization unit 160, and the like.

Here, the control unit 110 may include any of all kinds of devices capable of processing data, such as a processor or the like. Here, the term 'processor' may indicate, for example, a data-processing device embedded in hardware, which has a circuit physically structured for performing functions represented as code or instructions included in a program. Examples of such a data-processing device embedded in hardware may include processing devices such as a microprocessor, a central processing unit (CPU), a processor core, a multiprocessor, an application-specific integrated circuit (ASIC), a field-programmable gate array (FPGA), and the like, but the present invention is not limited thereto.

The profiling data reception unit 120 receives profiling source data from the multicore embedded system (200 in FIG. 1).

Here, the profiling data reception unit 120 may be a device that includes hardware and software that are necessary in order to send and receive signals, such as control signals or data signals, through a wired and wireless connection with the multicore embedded system (200 in FIG. 1).

Here, the profiling source data may have a preset size, and may be received continuously.

Here, the profiling data reception unit 120 may infinitely receive profiling source data unless a user makes a request for interruption and a stop notification is received from the embedded core system (200 in FIG. 1).

Here, the received profiling source data may include information about an event on a certain core in the multicore embedded system (200 in FIG. 1) and information about the time at which the event occurred.

The memory 130 temporarily stores pieces of profiling source data received from the profiling data reception unit 120 in the order of arrival. Accordingly, when there is a large difference between the speed at which the profiling data analysis unit 140 processes data and the speed at which the profiling data reception unit 120 receives data, the data may be prevented from being omitted.

Here, the memory 130 may include magnetic storage media or flash storage media, but the present invention is not limited thereto.

Here, the memory 130 may store data in the order of arrival and deliver the data in the order of arrival because the memory 130 is configured as a queue having a First-In First-Out (FIFO) structure.

Also, the memory 130 may function to temporarily or permanently store data processed by the control unit 110.

Also, the memory 130 may function to temporarily store analysis data created by the profiling data analysis unit 140.

The profiling data analysis unit 140 analyzes profiling source data and thereby determines the core for which the profiling source data was generated.

Here, the profiling data analysis unit 140 may determine the time at which each of events included in the profiling source data occurred.

Here, the profiling data analysis unit 140 creates analysis data by merging events that occurred on the same core in a time-ordered sequence based on the time at which each of the events occurred, and may manage the data sorted for each core separately.

Here, the profiling data analysis unit 140 may determine whether each of events included in the profiling source data is a past event depending on the time at which the event occurred.

Here, when the time at which a target event to be determined occurred is included in a time interval corresponding to any of profiling files already created by the profiling file management unit 150, the target event may be determined to be a past event. Therefore, when the time at which the target event occurred is not included in the time interval corresponding to any of the already created profiling files, the target event is not a past event.

Here, the profiling data analysis unit 140 may create analysis data by sorting the events determined not to be past events on a core basis and by merging the events sorted for each core in a time-ordered sequence based on the time at which each of the events occurred.

The profiling file management unit 150 stores continuous profiling data as a file in response to a request from the profiling data analysis unit 140.

Here, when the analysis data created by the profiling data analysis unit 140 reaches a preset size limit, the profiling file management unit 150 may create a new profiling file and stores the analysis data therein.

When continuous profiling is performed, a large amount of data may be received. Here, merging all of the received data into a single piece of data is unsuitable from the aspect of management. This is because the size of data that the continuous profiling apparatus 100 for the multicore embedded system is capable of simultaneously visualizing or processing is limited depending on the memory of a host computer. Therefore, when the size of the merged analysis data becomes large, the profiling file management unit 150 stores the analysis data as a file and deletes the same from the memory 130.

Here, the profiling file management unit 150 may additionally store the event determined by the profiling data analysis unit 140 to be a past event in a target profiling file, corresponding to the time at which the event occurred, in a time-ordered sequence based on the time at which the target event occurred.

Here, the profiling file management unit 150 may create a master file that stores information about time intervals corresponding to respective profiling files.

Accordingly, the time intervals of the respective profiling files do not overlap each other, and data in the consecutive profiling files may be connected in a time-ordered sequence. That is, if data in a profiling file includes an event before A, the following profiling file may include data only about events that occurred after A.

The profiling result visualization unit 160 functions to visualize profiling files in which data are partitioned and stored.

Here, the data received from the multicore embedded system (200 in FIG. 1) may be compressed in order to reduce a load, and the profiling result visualization unit 160 may decompress the compressed data and convert the decompressed data into objects for visualization.

Here, the profiling result visualization unit 160 may visualize a profiling result on a profiling file basis, rather than simultaneously visualizing all profiling files.

Here, the profiling result visualization unit 160 may provide an interface through which profiling results corresponding to the respective profiling files may be retrieved in temporal order using a sequence written in the master file. For example, profiling results of the respective profiling files may be sequentially checked using "previous" and "next" buttons on the provided interface.

Here, the profiling result visualization unit 160 may provide an interface through which a profiling result corresponding to a specific profiling file may be retrieved. For example, the profiling result of a specific profiling file may be checked using a "go to" button on the provided interface.

Accordingly, even though continuous profiling is performed, the profiling result may be partitioned into multiple profiling files, of which the time intervals do not overlap, so as to be easily managed, and the profiling results of the respective profiling files may be individually visualized, whereby a user may easily acquire information.

Figure 7:
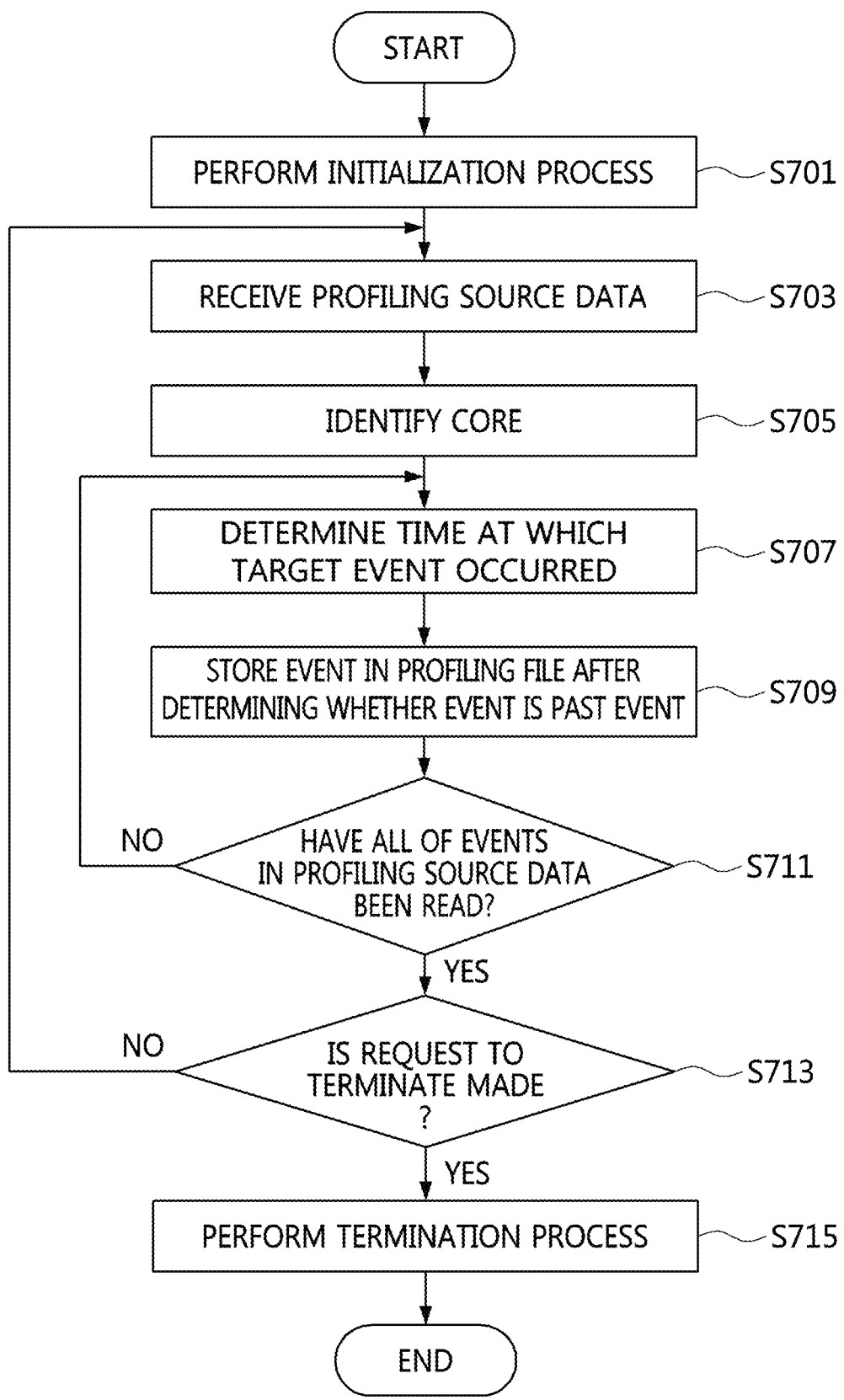
FIG. 7 is a flowchart that shows a method for continuous profiling for a multicore embedded system according to an embodiment of the present invention.

FIG. 7 is a flowchart that shows a method for continuous profiling for a multicore embedded system according to an embodiment of the present invention.

Referring to FIG. 7, in the method for continuous profiling for a multicore embedded system according to an embodiment of the present invention, a continuous profiling apparatus (100 in FIG. 1) for a multicore embedded system performs an initialization process for profiling at step S701.

Here, the initialization process may include the process of freeing up memory in order to receive and process profiling source data.

Also, in the method for continuous profiling for a multicore embedded system according to an embodiment of the present invention, the continuous profiling apparatus (100 in FIG. 1) for a multicore embedded system receives at least one piece of profiling source data from a multicore embedded system (200 in FIG. 1) at step S703.

Here, the received profiling source data may include events for each core of the multicore embedded system (200 in FIG. 1).

Also, in the method for continuous profiling for a multicore embedded system according to an embodiment of the present invention, the continuous profiling apparatus (100 in FIG. 1) for a multicore embedded system analyzes the profiling source data and thereby determines the core corresponding to the profiling source data at step S705.

That is, which core in the embedded system (200 in FIG. 1) corresponds to the profiling source data may be determined.

Also, in the method for continuous profiling for a multicore embedded system according to an embodiment of the present invention, the continuous profiling apparatus (100 in FIG. 1) for a multicore embedded system analyzes the profiling source data and determines at step S707 the time at which a target event included in the profiling source data occurred.

That is, the time at which each of the events included in the profiling source data occurred and the core in which the event occurred may be determined.

Also, in the method for continuous profiling for a multicore embedded system according to an embodiment of the present invention, the continuous profiling apparatus (100 in FIG. 1) for a multicore embedded system determines whether the target event is a past event and stores the same in a profiling file at step S709.

Also, in the method for continuous profiling for a multi-core embedded system according to an embodiment of the present invention, the continuous profiling apparatus (100 in FIG. 1) for a multicore embedded system determines at step S711 whether all of the events in the profiling source data have been read and analyzed.

When it is determined at step S711 that not all of the events included in the profiling source data have been read, the process returns to analyzing the target event at step S707.

When it is determined at step S711 that all of the events included in the profiling source data have been read, whether a request to terminate profiling is made is determined at step S713.

When it is determined at step S713 that a request to terminate profiling is not made, the process returns to receiving profiling source data from the multicore embedded system (200 in FIG. 1) at step S703.

When it is determined at step S713 that a request to terminate profiling is made, the terminating process is performed at step S715.

Figure 8:
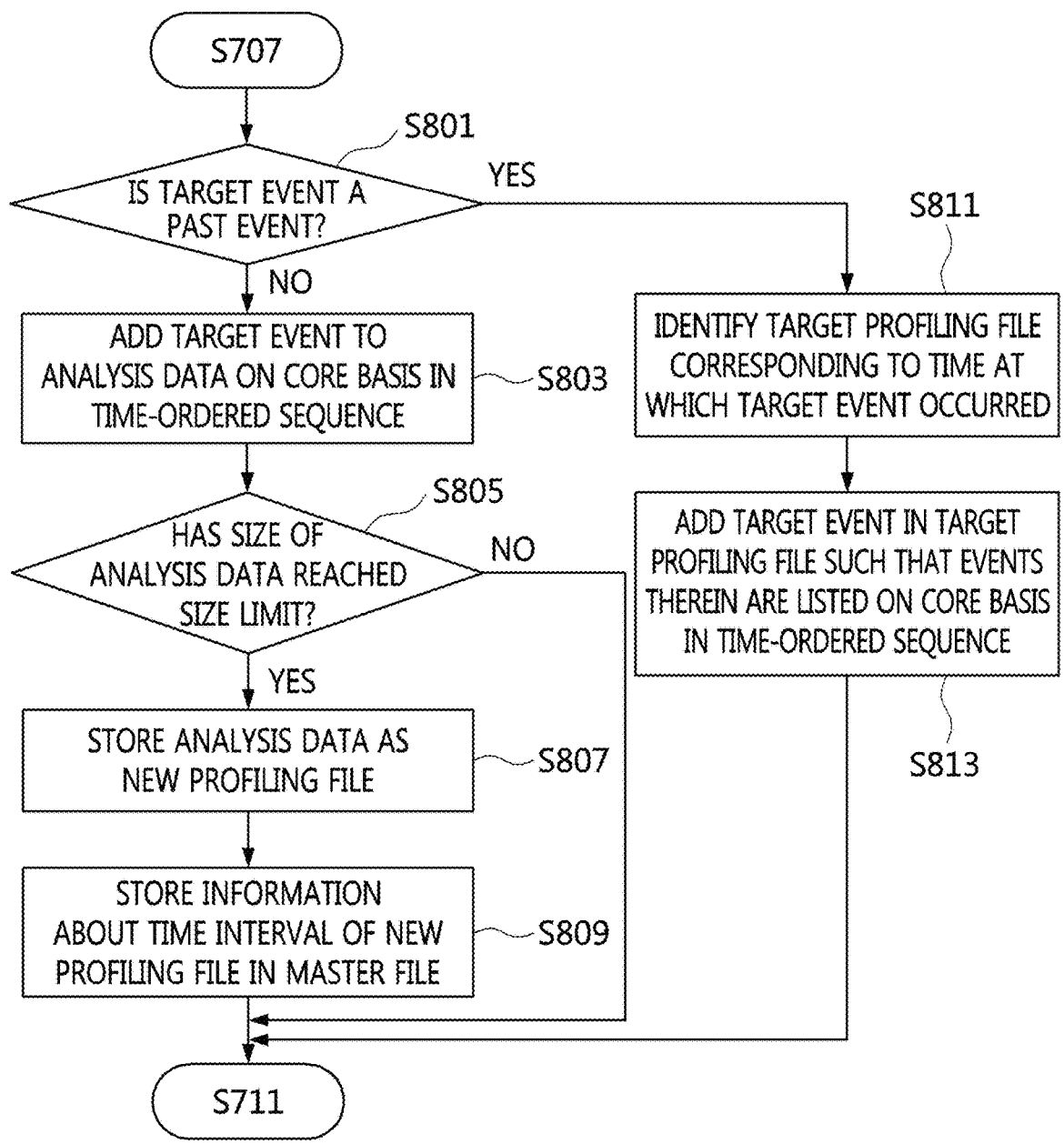
FIG. 8 is a flowchart that shows an example of the step of determining whether an event is a past event and storing the event in a profiling file, illustrated in FIG. 7.

FIG. 8 is a flowchart that shows an example of the step (S709) of determining whether a target event is a past event and storing the same in the profiling file illustrated in FIG. 7.

Referring to FIG. 8, in the step (S709) of determining whether a target event is a past event and storing the same in the profiling file illustrated in FIG. 7, whether a target event is a past event is determined at step S801.

Here, when the time at which the target event occurred is included in the time interval of any of already created profiling files, the target event may be determined to be a past event. That is, when the time at which the target event occurred is not included in the time interval of any of already created profiling files, it may be determined that the target event is not a past event.

When it is determined at step S801 that the target event is not a past event, the target event is added and merged to analysis data for each core in a time-ordered sequence at step S803 based on the time at which the target event occurred.

Also, in the step (S709) of determining whether a target event is a past event and storing the same in the profiling file, illustrated in FIG. 7, whether the size of the analysis data reaches a size limit after step S803 is determined at step S805.

When it is determined at step S805 that the size of the analysis data reaches the size limit, the analysis data is stored as a new profiling file at step S807, and information about the time interval of the new profiling file is added to a master file at step S809.

When it is determined at step S805 that the size of the analysis data has not reached the size limit, the process goes to the step (S711) of determining whether all of events included in the profiling source data have been read, which is illustrated in FIG. 7.

When it is determined at step S801 that the target event is a past event, information about a target profiling file corresponding to the time at which the target event occurred is acquired at step S811, and the target event is merged to data in the target profiling file such that events therein are listed on a core basis in a time-ordered sequence at step S813 depending on the time at which each of the events therein occurred. Then, the process goes to the step (S711) of determining whether all of the events included in the profiling source data have been read, illustrated in FIG. 7.

Accordingly, the time intervals of the profiling files do not overlap, and among the events included in profiling source data, an event that occurred at a time included in the time interval of any of the existing profiling files is added and stored in the existing profiling file, whereby the problem in which the time intervals of profiling files overlap each other may be prevented.

Also, a large number of pieces of profiling source data, acquired during continuous profiling, is partitioned into multiple profiling files, whereby profiling data may be effectively used and managed.

Figure 9:
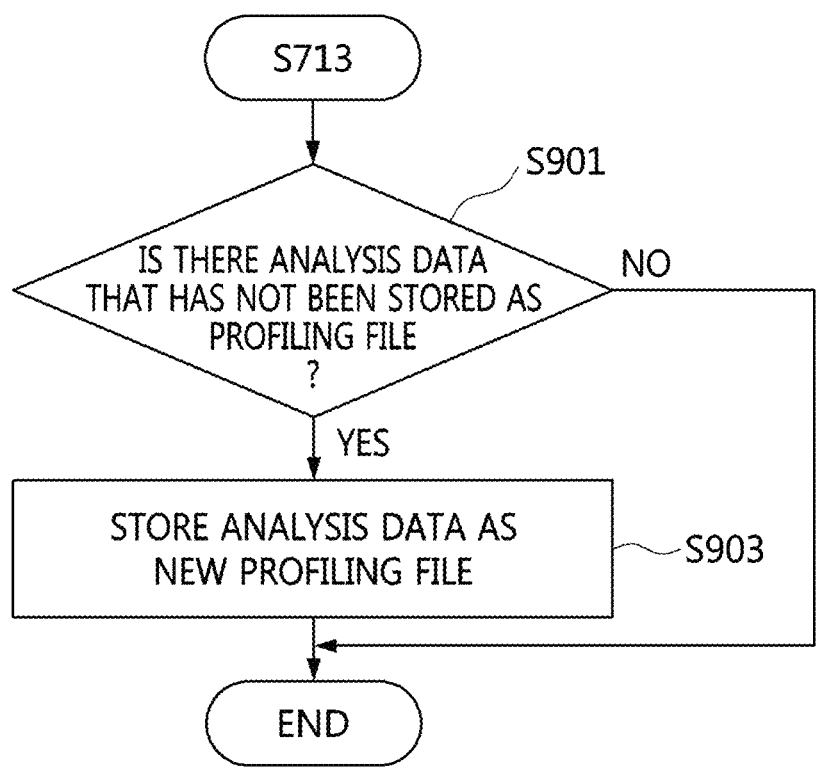
FIG. 9 is a flowchart that shows an example of the step of performing a termination process illustrated in FIG. 7.

FIG. 9 is a flowchart that shows an example of the step (S715) of performing a termination process, illustrated in FIG. 7.

Referring to FIG. 9, in the step (S715) of performing a termination process, illustrated in FIG. 7, whether analysis data that has not been stored as a profiling file is present is determined at step S901. When it is determined that analysis data that has not been stored as a profiling file is present, the analysis data is stored as a new profiling file at step S903.

FIGS. 10 to 12 are views that show an example of a result of partitioning of the profiling source data illustrated in FIG. 2 into profiling files according to an embodiment of the present invention.

FIGS. 10 to 12 show an example of a result of partitioning the profiling source data in FIG. 2 according to the embodiment of the present invention, described with reference to FIGS. 7 to 9. Here, a size limit for creating a profiling file is set to 30 events. That is, when analysis data includes 30 events, the analysis data is stored as a new profiling file.

Referring to FIGS. 10 to 12, the profiling source data illustrated in FIG. 2 is partitioned into and stored as three files 10a, 11a and 12a. The profiling files 10a, 11a and 12a have respective time intervals that do not overlap each other, and include event data for all cores.

The time interval of file 1 10a is from 1:00 to 1:45, the time interval of file 2 11a is from 1:46 to 2:51, and the time interval of file 3 12a is from 2:52 to 3:44.

Specifically, because the size limit is set to 30 events, pieces of profiling source data D0_0, D0_1 and D2_0 are merged on a core basis in the order that events included therein occurred in file 1 10a. Then, depending on the times at which events in the pieces of profiling source data D0_0, D0_1 and D2_0 occurred, the time interval of file 1 10a is set to 1:00 to 1:45. Then, because pieces of profiling source data D0_2, D1_0 and D3_0, which are received after file 1 10a was created, include some events of which the occurrence time is included in the time interval of file 1 10a, the eleven corresponding events, E0_20, E0_21, E0_22, E1_00, E1_01, E1_02, E3_00, E3_01, E3_02, E3_03 and E3_04 are added to file 1 10a in a time-ordered sequence. Also, file 2 11a is created and managed in the same manner as the method used to create and manage file 1 10a.

File 3 12a is the last profiling file created by performing a termination process in response to a request to terminate profiling. Accordingly, analysis data that has not been stored as a profiling file because the number of events therein is less than the size limit, which is 30 events, is stored as file 3 12a according to the termination process. Therefore, the size of file 3 12a is 26 events, which is less than the size limit.

Here, the size of each of the finally created profiling files may be equal to or less than (the preset size limit)+(the size of a profiling buffer for each core)*(the total number of cores−1). This is because, even if events are added to an already created profiling file, a maximum of one piece of profiling source data, the size of which is equal to or less than the profiling buffer, may be received from each core.

That is, in the example illustrated in FIGS. 10 to 12, the number of events in each profiling file ranges from 30 to 60 (=30+10*3). Also, the size of each of the profiling files, excluding the last profiling file created through the termination process, is equal to or greater than the preset size limit.

Here, 30 events set as the size limit for creating a profiling file is merely an embodiment, and the size limit may be set to a very large value in a real-world application.

Here, the size limit for creating a profiling file may be set to more than 100 times the size of profiling source data, in which case there is little difference between the sizes of profiling files.

Accordingly, when the proposed method is used, profiling files may be managed so as to have similar sizes.

Figure 13:
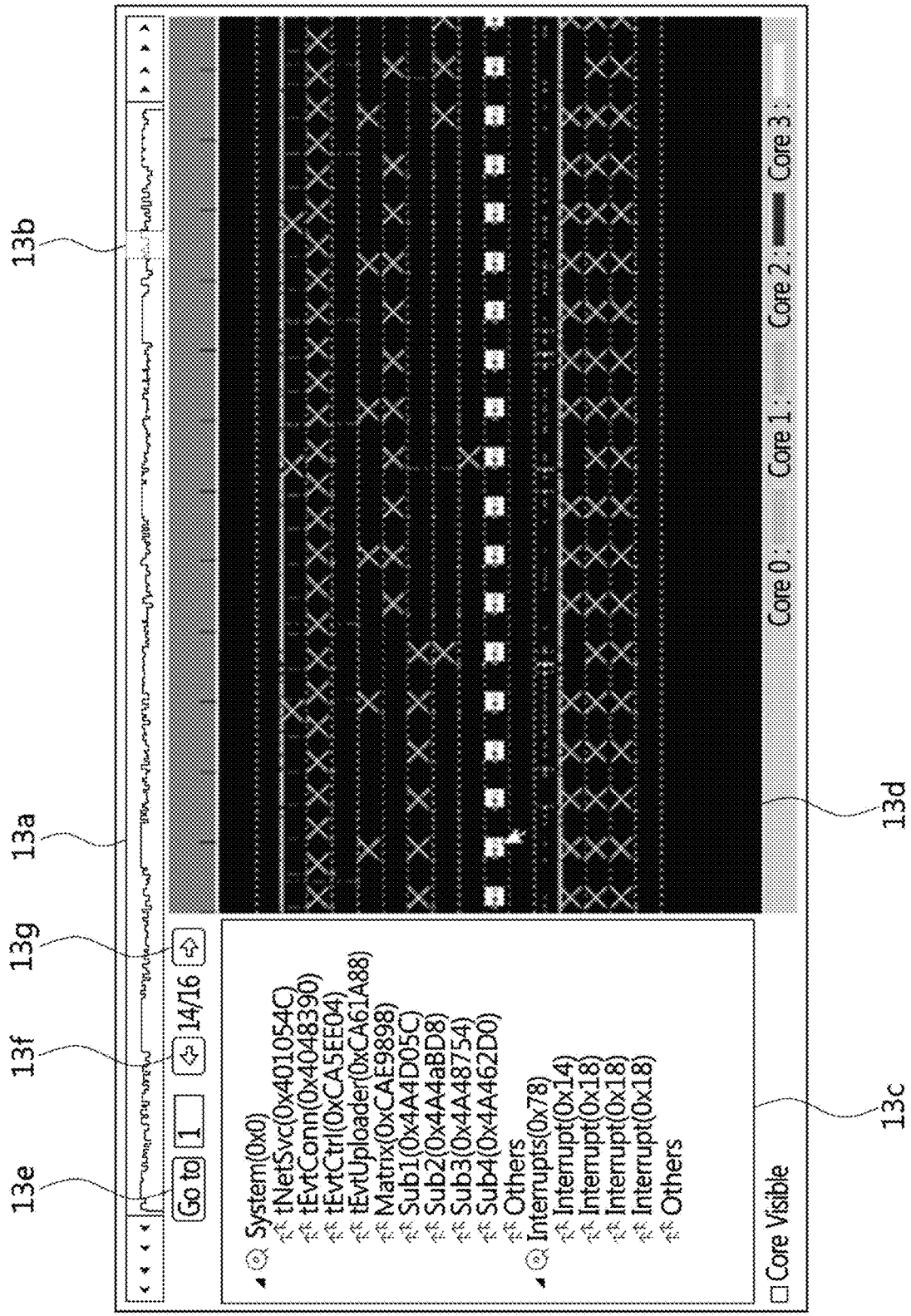
FIG. 13 is a view that shows an example in which a profiling result is visualized according to an embodiment of the present invention.

FIG. 13 is a view that shows an example of a visualized profiling result according to an embodiment of the present invention.

Referring to FIG. 13, when a profiling result is visualized, the result is displayed on a profiling file basis.

Here, the screen that shows a visualized profiling result may include a search bar 13a for supporting search in a single profiling file based on time, and an enlarged area selection unit 13b for selecting an area, for which a specific profiling result is to be checked by enlarging a certain time interval, may be included in the search bar 13a.

Here, the screen that shows a visualized profiling result may include a result display unit 13d for displaying a specific profiling result for the area selected by the enlarged area selection unit 13b.

Here, the screen that shows a visualized profiling result may include a target selection unit 13c for selecting a system for profiling.

Here, the screen that shows a visualized profiling result may provide an interface through which a profiling result corresponding to a specific profiling file may be retrieved. For example, using a "Go to" button 13e on the provided interface, a profiling result for a specific profiling file may be checked.

Here, the screen that shows a visualized profiling result may provide an interface through which profiling results corresponding to the respective profiling files may be sequentially retrieved using the sequence written in a master file. For example, using "previous" and "next" buttons 13f and 13g on the provided interface, the profiling results for the respective profiling files may be sequentially checked.

The above-described embodiment of the present invention may be implemented as program instructions executable by various computer components, and may be recorded in computer-readable storage media. The computer-readable storage media may separately or collectively include program instructions, data files, data structures, and the like. The program instructions recorded in the computer-readable storage media may be specially designed and configured for the present invention, or may be available due to being well known to computer software experts. Examples of the computer-readable storage media include magnetic media such as a hard disk, a floppy disk and a magnetic tape, optical media such as a CD-ROM and a DVD, and magneto-optical media such as a floptical disk, ROM, RAM, flash memory, and the like, that is, a hardware device specially configured for storing and executing program instructions. Examples of the program instructions include not only machine code made by a compiler but also high-level language code executable by a computer using an interpreter or the like. The hardware device may be configured such that it operates as one or more software modules in order to perform the operations according to the present invention, and vice-versa.

The present invention enables profiling for a multicore embedded system to be performed for a long time. Accordingly, time synchronization of asynchronous continuous profiling data is processed during the reception thereof, whereby execution of a program may be checked for a long time without performance degradation, which may be caused by processing large-scale continuous profiling data.

Although specific embodiments have been described in the specification, they are not intended to limit the scope of the present invention. For the conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless a specific term, such as "essential", "important", or the like, is used, corresponding components may not be absolutely necessary.

Accordingly, the spirit of the present invention should not be construed as being limited to the above-described embodiments, and the entire scope of the appended claims and their equivalents should be understood as defining the scope and spirit of the present invention.

What is claimed is:

1. An apparatus for continuous profiling for a multicore embedded system, comprising:
   a profiling data reception unit for receiving one or more pieces of profiling source data, in which events of each core in a multicore embedded system are written, from the multicore embedded system;
   a profiling data analysis unit for:
      determining, by analyzing the profiling source data, a time at which each of the events included in the profiling source data occurred and a core corresponding to each of the events, and
      determining whether each of the events is a past event depending on the determined time at which the event occurred, an event being a past event when the determined time at which the event occurred is included in a respective time interval of any one of one or more profiling files, the one or more profiling files having been already created; and
   a profiling file management unit for distinguishing each of the events depending on the determination of whether the event is a past event and storing the events in the one or more profiling files, wherein when a target event among the events is determined to be a past event, the profiling file management unit:
      identifies a target profiling file having a time interval corresponding to the time at which the target event occurred, and
      merges and stores the target event in the target profiling file such that events stored in the target profiling file are listed on a core basis in a time-ordered sequence based on respective times at which the events stored in the target profiling file occurred.

2. The apparatus of claim 1, wherein the profiling file management unit creates a master file for storing information about the respective time intervals of the one or more profiling files.

3. The apparatus of claim 1, wherein:
when it is determined that the target event is not the past event, the profiling data analysis unit merges the target event to analysis data on a core basis in a time-ordered sequence based on the time at which the target event occurred; and
the profiling file management unit stores the analysis data as a new profiling file when a size of the analysis data is greater than or equal to a preset first size.

4. The apparatus of claim 3, wherein each of the profiling files is configured such that events sorted on a core basis are merged therein.

5. The apparatus of claim 3, wherein the profiling source data has a preset second size, and the preset first size is 100 or more times larger than the preset second size.

6. The apparatus of claim 1, wherein the profiling data reception unit temporarily stores the received pieces of profiling source data in memory in an order of arrival and delivers the pieces of profiling source data in the order of arrival.

7. The apparatus of claim 1, further comprising:
a profiling result visualization unit for visualizing profiling results corresponding to the profiling files.

8. The apparatus of claim 7, wherein the profiling result visualization unit visualizes the profiling result on a profiling file basis.

9. A method for continuous profiling for a multicore embedded system, comprising:
receiving one or more pieces of profiling source data, in which events of each core in a multicore embedded system are written, from the multicore embedded system;
determining, by analyzing the profiling source data, a time at which each of the events included in the profiling source data occurred and a core corresponding to each of the events;
determining whether each of the events is a past event depending on the time at which the event occurred, an event being a past event when the determined time at which the event occurred is included in a respective time interval of any one of one or more profiling files, the one or more profiling files having been already created; and
distinguishing each of the events depending on the determination of whether the event is a past event and storing the events in the one or more profiling files,
wherein when a target event among the events is determined to be a past event, storing the events in the one or more profiling files includes:
identifying a target profiling file having a time interval corresponding to the time at which the target event occurred, and
merging and storing the target event in the target profiling file such that events stored in the target profiling file are listed on a core basis in a time-ordered sequence based on respective times at which the events stored in the target profiling file occurred.

10. The method of claim 9, wherein storing the events in the profiling files comprises:
creating a master file for storing information about the respective time intervals of the one or more profiling files.

11. The method of claim 9, further comprising:
when it is determined that the target event is not a past event, merging the target event to analysis data on a core basis in a time-ordered sequence based on the time at which the target event occurred; and
storing the analysis data as a new profiling file when a size of the analysis data is greater than or equal to a preset first size.

12. The method of claim 11, wherein each of the profiling files is configured such that events sorted on a core basis are merged therein.

13. The method of claim 11, wherein the profiling source data has a preset second size, and the preset first size is 100 or more times larger than the preset second size.

14. The method of claim 9, wherein receiving the profiling source data comprises temporarily storing the received pieces of profiling source data in memory in an order of arrival and delivering the pieces of profiling source data in the order of arrival.

15. The method of claim 9, further comprising:
visualizing profiling results corresponding to the profiling files.

16. The method of claim 15, wherein visualizing the profiling results is configured to visualize the profiling result on a profiling file basis.

* * * * *